(12) United States Patent
Watkins et al.

(10) Patent No.: US 9,027,140 B1
(45) Date of Patent: *May 5, 2015

(54) APPLICATION MALWARE FILTERING FOR ADVERTISING NETWORKS

(71) Applicant: Appthority, Inc., San Francisco, CA (US)

(72) Inventors: Kevin Watkins, San Francisco, CA (US); Anthony John Bettini, San Francisco, CA (US); Domingo J. Guerra, San Francisco, CA (US); Ian Eyberg, San Francisco, CA (US)

(73) Assignee: Appthority, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/205,205

(22) Filed: Mar. 11, 2014

Related U.S. Application Data

(60) Provisional application No. 61/869,011, filed on Aug. 22, 2013.

(51) Int. Cl.
*G06F 21/00* (2013.01)
*H04L 29/06* (2006.01)

(52) U.S. Cl.
CPC ........ *H04L 63/0227* (2013.01); *H04L 63/1408* (2013.01)

(58) Field of Classification Search
CPC ...................................................... H04L 63/20
USPC ........................................... 726/1, 22, 23, 24
See application file for complete search history.

(56) References Cited

U.S. PATENT DOCUMENTS

| | | | |
|---|---|---|---|
| 2010/0281539 A1* | 11/2010 | Burns et al. | 726/23 |
| 2013/0152187 A1* | 6/2013 | Strebe et al. | 726/11 |
| 2013/0326476 A1* | 12/2013 | Wyatt et al. | 717/120 |

* cited by examiner

*Primary Examiner* — Jason Lee
(74) *Attorney, Agent, or Firm* — Van Pelt, Yi & James LLP

(57) ABSTRACT

Application malware filtering for advertising networks is disclosed. For example, techniques for providing a system and process for detecting malicious ad content (e.g., or other undesirable ad content) distributed by advertising (ad) networks are disclosed. In some embodiments, application ("app") malware filtering for advertising networks includes receiving ad content; processing the ad content; and automatically determining whether the ad content is associated with a malicious app.

18 Claims, 5 Drawing Sheets

APPLICATION MALWARE FILTERING FOR ADVERTISING NETWORKS

CROSS REFERENCE TO OTHER APPLICATIONS

This application claims priority to U.S. Provisional Patent Application No. 61/869,011 entitled APPLICATION MALWARE FILTERING FOR ADVERTISING NETWORKS filed Aug. 22, 2013, which is incorporated herein by reference for all purposes.

BACKGROUND OF THE INVENTION

An application, also referred to as an "app," generally refers to a software application that executes on a computing device, such as a mobile device. For example, mobile devices include smart phones, phablets, tablets, laptops, and/or other mobile devices. Various application platforms exist for different operating systems, such as Apple iOS® platforms, Google Android® platforms, and Microsoft Windows® platforms. Application markets exist for each of these application platforms, which can make available thousands to millions of different apps for such platforms.

For example, various apps are available for executing on smart phones such as the Apple iPhone® or Samsung Galaxy®, tablets such as the Apple iPad® or Google Nexus®, embedded devices executing the Google Android® operating system such as those shipped by Mentor Graphics and their partners, and computer operating systems such as Apple Mac OS X® and Microsoft Windows 8®.

BRIEF DESCRIPTION OF THE DRAWINGS

Various embodiments of the invention are disclosed in the following detailed description and the accompanying drawings.

DETAILED DESCRIPTION

Figure 1:
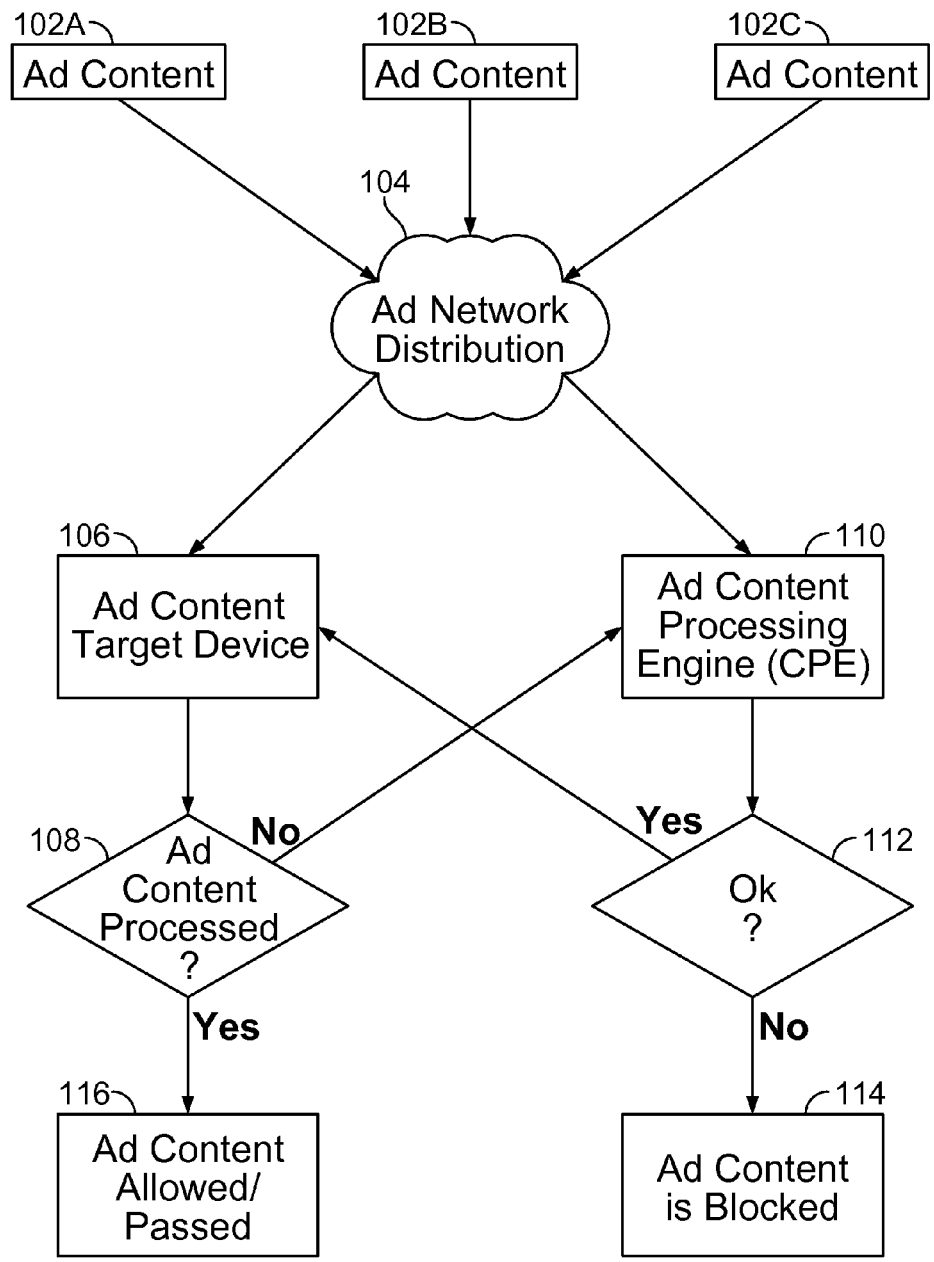
FIG. 1 is a functional block diagram of an architecture of a system for providing application malware filtering for advertising networks in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As the number of mobile applications ("apps") increases, a growing misuse of applications using ad networks has surfaced. For example, application developers typically include an ad network(s) in their apps as a mechanism to push ad content directly to the application executed on mobile devices to generate ad revenue. However, this ad content may also include undesirable content that leads and/or exposes the application, and thus exposes the mobile device executing the application, to malware, spyware, and/or threatens a user's privacy.

The number of apps available to the end user continues to grow at staggering rates. Apps can be downloaded from official marketplaces, like Google Play or the Apple Store, as well from third party markets. As these repositories of apps continue to grow, marketplace maintainers and third parties have rushed to provide application ("app") scanning in order to keep the marketplace free of risky and malicious code and content.

However, a new and growing problem exists with apps that include ad network SDK's in which malicious code and content is not present during app scanning (e.g., apps can be scanned by app stores before allowing the apps to be available from the app stores and/or using client solutions that can scan apps upon download by an end user to a mobile device to thereby scan the app prior to complete app installation/use on the mobile device). For example, after such an app is installed by an end user (user) on the user's device (e.g., a mobile device, such as a smart phone, phablet, tablet, or another type of mobile device), the ad network is able to push potentially malicious code and/or content directly to the app installed on the end user's device, bypassing marketplaces and other mechanisms that can perform a malware scanning of the app.

What are needed are techniques for identifying malware in advertising networks of apps for mobile devices. In particular, what are needed are new techniques for filtering such potentially malicious ad content (e.g., code and/or content) that can be delivered to apps already installed on mobile devices.

Accordingly, various techniques for filtering such potentially malicious ad content that can be delivered to apps already installed on mobile devices are disclosed herein. For example, a system, such as a cloud-based ad content analysis system (e.g., which can be provided as a cloud service) as further described herein, can scan ad content and filter content based on, for example, content that contains risky code and/or risky content, malicious code and/or malicious content, and/ or code and/or content that can violate policies (e.g., policies can include app policies and/or URL policies, which can specify rules for malware and/or other app related rules, such as enterprise policies and/or end user policies).

Thus, techniques for application malware filtering for advertising networks are disclosed. For example, techniques for providing a system and process for detecting malicious ad content (e.g., or other undesirable ad content) distributed by advertising (ad) networks are disclosed.

In some embodiments, application ("app") malware filtering for advertising networks includes receiving ad content; processing the ad content; and automatically determining whether the ad content is associated with a malicious app. For example, processing the ad content can be performed using a cloud service for ad network providers for automatically detecting malware apps being distributed through the ad network. As further described below, the cloud service can include an ad content processing engine that can automatically analyze the ad content and apply a policy to determine whether to perform an action with respect to the ad content, such as to filter, log/report, allow, and/or some other action(s). As an example, ad content can be filtered based on malware app related rules and/or other content related rules included in a policy.

In one embodiment, application malware filtering for advertising networks further includes determining that the ad content is associated with an in-app purchase that is associated with the malicious app. In one embodiment, application ("app") malware filtering for advertising networks further includes determining that the ad content is associated with malicious or undesirable content.

In one embodiment, application malware filtering for advertising networks further includes determining that the ad content is associated with malicious or undesirable content based on a policy and/or an enterprise policy. For example, an ad network or an enterprise can configure a policy to manage which content to allow to be distributed via an app delivered as ad content to mobile devices executing the app using various techniques described herein.

In one embodiment, application malware filtering for advertising networks further includes performing a static analysis of the content. In one embodiment, application malware filtering for advertising networks further includes performing a dynamic analysis of the content. For example, a content processing engine can perform both a static analysis and a dynamic analysis of the ad content using various techniques described herein. Various techniques for performing static analysis and dynamic analysis of ad content are further described below.

In one embodiment, application malware filtering for advertising networks further includes determining whether the malware app attempts to thwart malware app detection by using an ad network for app distribution. For example, the cloud service can compare an app extracted from the ad content and determine whether the app matches any previously analyzed apps available from one or more public app stores (e.g., using a hash or other techniques for uniquely identifying apps). In this example, if the app that is linked to or included in the ad content does not match any of the apps that are known to be available in such public app stores (e.g., the cloud service can maintain a data store that includes a hash or other unique identifier of apps available in such public app stores), that can be an indicator that this is a new app that may be using ad distribution networks as a distribution mechanism to avoid malware app detection (e.g., which would otherwise be performed by public app stores before allowing such apps to be available in their app stores). These and other techniques can be used to determine whether the malware app attempts to thwart malware app detection by using an ad network for app distribution.

In one embodiment, application malware filtering for advertising networks further includes receiving the ad content from an ad network provider. For example, the ad content can be provided to a cloud service for ad content analysis using various techniques described herein, such as via an API, via a user portal, and/or through another interface mechanism. As another example, the ad content can be intercepted on a mobile device using a client solution (e.g., a local function, such as an agent that executes on a processor of the mobile device), which can locally perform ad content analysis (e.g., a complete or partial set of analysis can be performed locally using various techniques described herein and, in some cases, the ad content analysis is sent to a cloud service to perform a complete or additional analysis, in which the ad content can be provided to the cloud service via an API, via a user portal, and/or through another interface mechanism).

In one embodiment, application malware filtering for advertising networks further includes examining (e.g., recursively) one or more links included in the ad content (e.g., goto web site(s), app store(s), and/or other sources linked to from the ad content). For example, ad content can include links to other apps that can also be scanned for malware and/or based on policies. Ads can also include other content and/or links to other content (e.g., web pages, videos, text, and/or other content) that can be scanned for malware and/or based on policies.

For example, ads can be filtered for malware and/or based on rules included in a policy. Example policies can include rules that prohibit certain types of ads, such as not allowing ads for pornography, not allowing ads for illegal drugs, not allowing ads for gambling, not allowing ads for game apps, and/or various other types of ads or content.

As an example, a user, named Alice, is an employee of ACME Company. Alice has a mobile device (e.g., smart phone) that is provided and/or managed by ACME Company. Alice has a CHESS game on her mobile device. The CHESS game is a free game, but this free game provides ads through the game app on the mobile device. The ads are distributed through one or more ad networks for the CHESS game. Before ads are distributed by the ad network (e.g., one or more ad network providers) to Alice's mobile device executing the CHESS game, each of the ads can be sent to a content processing engine to scan such ads for malware apps and/or based on other policy criteria/requirements. In some cases, ad content can be scanned to analyze any apps included or linked to in the ad content for determining whether such apps or other content are associated with malware and/or are in compliance with any policy criteria/requirements, such as an enterprise policy configured by ACME company. In this example, ACME company may prohibit ad content that includes and/or links to malware apps and/or apps that violate a privacy rule(s).

As another example, an ad network provider can send any new ad content to the cloud service to determine whether such new ad content includes or links to any malware and/or violates any rules/aspects of a policy configured by the ad network provider. In this example, the ad network provider may prohibit ad content that includes illicit content, such as ads that include and/or link to content for pornography and/or illegal drugs. The ad network provider may also prohibit ad content that includes and/or links to malware apps.

In some embodiments, in-line application malware filtering for advertising networks includes logging network traffic to and from a mobile device; filtering the network traffic to extract ad content; and submitting the ad content (e.g., and/or links to the ad content) to a cloud service for automatically detecting malware apps being distributed through one or more ad networks.

In one embodiment, in-line application malware filtering for advertising networks further includes receiving a response from the cloud service that the ad content is associated with an in-app purchase that is associated with a malicious app. In one embodiment, in-line application malware filtering for advertising networks further includes receiving a response from the cloud service that the ad content is associated with malicious or undesirable content. In one embodiment, in-line application malware filtering for advertising networks further includes receiving a response from the cloud service that the ad content is associated with malicious or undesirable content based on a policy. In one embodiment, in-line application malware filtering for advertising networks further includes receiving a response from the cloud service that the ad content is associated with malicious or undesirable content based on an enterprise policy.

In one embodiment, in-line application malware filtering for advertising networks further includes examining (e.g., recursively) one or more links included in the ad content (e.g., goto web site(s), app store(s), and/or other sources linked to from the ad content).

In one embodiment, in-line application malware filtering for advertising networks further includes extracting an advertising network identifier (e.g., parsing and extracting an ad ID included in a link to ad content, such as adserver.com/token/adid=1234) associated with the ad content.

As an example, one or more mobile devices can be configured to filter and identify ad content distributed from an ad network to an app executed on the mobile device. In some cases, this approach can be used to dynamically intercept and analyze ad content delivered from one or more ad networks to one or more different apps executed on the mobile device, which can be used as an in-line ad network filtering solution and/or used as a honey pot to identify ad content that violates a policy (e.g., an ad content policy, which can include an app policy, a content filtering/URL policy, and/or other policy information). For example, links to ad content can be identified, extracted and associated with an ad network (e.g., based on an ad identifier, source, or other identifier information). The ad content can then be redirected to a cloud service to determine whether the ads include or link to any malware apps and/or comply with a policy configured by the (third party) ad network provider. If the ad content violates the policy, then the ad content can be filtered (e.g., blocked), and, in some cases, the ad distributor and/or app provider can be notified of the violation associated with the ad content. In some cases, such mobile device ad content honeypots can be distributed in different geographies, with different apps and/or platforms to increase a scope of ad content being analyzed and monitored (e.g., across different mobile device platforms, different apps, and/or different geographies).

These and various other examples for applying techniques for application ("app") malware filtering for advertising networks are discussed below with respect to various embodiments.

FIG. 1 is a functional block diagram of an architecture of a system for providing application malware filtering for advertising networks in accordance with some embodiments. In particular, FIG. 1 provides a diagram that illustrates a high level view of a system for filtering ad content in accordance with some embodiments. In some embodiments, the end-to-end process includes the following, as described below.

As shown in FIG. 1, ad content 102A, 102B, and 102C, which can be generated by, for example, advertisers and developers, is submitted to ad distribution network (or system) 104. The ad content is submitted to ad content processing engine (CPE) 110 using a content delivery mechanism. For example, the ad content can be submitted using an API end-point, a REST-API, or another interface mechanism. In another example, also shown in FIG. 1, the ad content is submitted directly to an end mobile device, shown as ad content target device 106. In this example, the ad content can be intercepted on the mobile device (e.g., a client solution, such as an agent or other local software component can be executed on the mobile device to perform this function) and can either be processed by a CPE executed locally on the mobile device (e.g., processed in-part locally or all such processing can be performed locally) and/or sent to a remote CPE, such as shown at 108, determining that if the ad content has not been processed to submit the ad content to CPE 110, such as using an external API end-point, a REST-API, or another interface mechanism. If the processed ad content is determined to be acceptable (e.g., based on a policy, such as an enterprise or other policy for apps and ad content), as determined at 112, then the ad can be provided to the ad content target device 106 and allowed/passed as also shown at 116. However, if the ad content is not determined to be acceptable (e.g., based on a policy, such as an enterprise or other policy for apps and ad content), then the ad content can be filtered (e.g., blocked) as shown at 114.

In one embodiment, CPE 110 analyzes the submitted ad content. CPE parses and extracts ad content to identify data such as, for example, malicious strings, URL links, and information pointing to external resources. For example, the ad content may include a link to an application in a mobile app market. CPE 110 also processes the app and analyzes it, looking for undesirable content and behaviors. For example, the app may be malicious and send premium SMS numbers on the end users mobile device for monetary gains. The app may also perform privacy relevant behaviors, such as opening the address book and sending end user contacts to a collector for viral marketing. The app and/or ad content may perform various other behaviors and/or include various other features or content that can trigger analysis or violations based on a policy, such as described herein with respect to various embodiments.

In one embodiment, analysis results are used to determine if the ad content requires action to be taken (e.g., block, allow, filter, alert/log/warn, tag, flag for further analysis, and/or perform various other operations). If the ad content is delivered to the end user by an ad network distribution or other delivery mechanism, such as ad distribution network 104 shown in FIG. 1, the analysis results can be sent back to the ad network to take actions prior to sending the ad content to the target device. Example actions can include filtering the ad content according to a policy for a target mobile device, or dropping the ad content from the ad distribution network completely. If the ad content is delivered directly to the target mobile device, the ad content can be sent to the CPE directly from the target device, or in another example implementation, the CPE resides and processes the ad content directly (e.g., locally in part or completely) on the target device (e.g., in some cases, certain ad content processing can be performed locally, and in some cases, certain ad content can be sent to a remote CPE for further analysis and processing, such as certain more robust behavioral analysis may be completed using a remote CPE, which may have more computing resources than the local device). In one example, some or all of the analysis results and actions in this example implementation can be performed locally on the mobile device.

In one embodiment, actions to filter and prevent the ad content from being sent to the target can include, for example, exceeded scoring thresholds, ad content that includes links to malicious resources, ad content that includes malicious strings or other undesirable content, and/or ad content that performs suspicious or undesired privacy related behavior(s). For example, determining if a given end user should be filtered from the ad content can include all end users, certain categories of end users (e.g., company or personal mobile devices), specific or categories of apps that are targeted by the ad content, ad targeted geographical regions, and filtering based off specific mobile device attributes (e.g., platform versions, which may or may not be effected by the CPE found app behaviors).

In one embodiment, the CPE generates a unique identifier of the ad content (e.g., a hash or other unique identifier). The CPE can then determine whether the ad content has been previously analyzed based on match of the unique identifier of the ad content in prior ad content search results. For example, in some cases, if the ad content was previously analyzed, prior results can be applied. In other cases, a new analysis of the ad content can be performed, for example, if a policy has been updated since the last analysis of that particular ad content.

Figure 2:
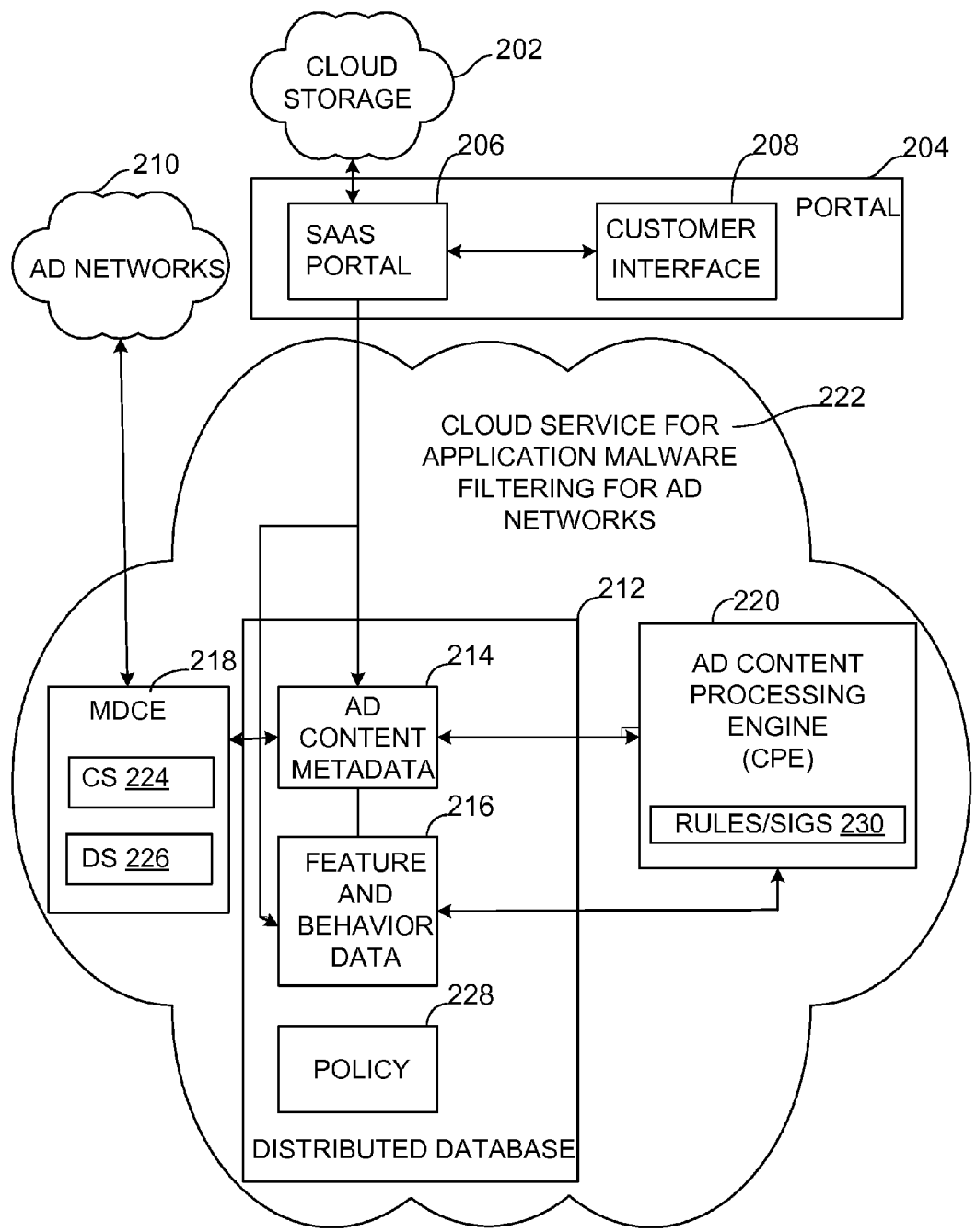
FIG. 2 is a functional block diagram of a cloud service for providing application malware filtering for advertising networks in accordance with some embodiments.

FIG. 2 is a functional block diagram of a cloud service for providing application malware filtering for advertising networks in accordance with some embodiments. As shown, cloud service for providing application malware filtering for advertising networks 222 receives ad content from ad networks 210 (e.g., ad content can be pushed or pulled from such ad networks (also referred to herein as ad distribution networks), such as using an API for batch jobs to download one or more ads (e.g., ad content) for analysis; and, in some implementations, ad content can also be received from mobile devices, such as described above with respect to FIG. 1). Example ad networks can include various commercial advertising networks such as AdChina, Ad Magnet, AdTaily, DoubleClick, ExoClick, Hiro-Media, VoloMedia, Zedo, and/or various other advertising networks. As also shown, cloud service 222 is in communication with a portal 204, which is in communication with cloud storage 202.

In some embodiments, a system for filtering ad content includes a content processing engine, such as CPE 220 as shown in FIG. 2, that is configured to analyze and filter (e.g., based on a policy, which can be configured or customized for/by an ad distribution network, for/by a mobile device network service provider, for/by an enterprise for mobile devices associated with a particular enterprise, and/or at a user or other group level of policy) ad content from the ad network responsible for distributing ad content to the end user devices (e.g., mobile devices).

For example, the system can be provided as a cloud-based ad content analysis content system. When the ad content is sent to the end user devices, the ad content is analyzed by the CPE before reaching a mobile device of any of the target end users. As similarly described above, in some implementations, the ad content data can be delivered to the CPE for analysis directly by the ad network provider (e.g., cloud to cloud). In other implementations, the ad content can be delivered to the CPE through an on-device collector (e.g., implemented as an agent or other locally executed function on the mobile device) that executes applications and intercepts the ad content before being displayed to the end user, sending the ad content to the CPE for analysis and approval. In this scenario, the ad content can be analyzed by the CPE on the mobile device (e.g., in part or, in some implementations, a full CPE analysis can be performed locally) or the CPE exists in the cloud and ad content is sent from the mobile device for analysis or for further analysis.

As further described below, cloud service 222 can perform an analysis of the ad content using ad content processing engine (CPE) 220 (e.g., the ad content processing engine can be implemented in software that is executed on a processor) and determine whether the app complies or violates a policy based on the analysis performed using the ad content processing engine. In an example implementation, ad content can be determined to be in violation of one or more policy requirements (e.g., in some cases, calculating probabilities/scores based on an ad content analysis, such as a malware risk score and/or a privacy risk score based on features and/or behaviors associated with the ad content).

In one embodiment, an architecture for providing automated application malware filtering for ad networks includes a Metadata Collection Engine (MDCE) 218, portal 204, and ad Content Processing Engine (CPE) 220, which can facilitate determining whether analyzed ad content complies with an applied policy. As shown, MDCE 218 and CPE 220 are implemented as part of a cloud service 222. For example, portal 204 and cloud service 222 can be provided as a web service or cloud service, which can be executed on one or more servers that include one or more processors for executing software implemented functions (e.g., using a hosted service provider, such as Amazon Web Services or another service provider).

As shown in FIG. 2, while presented as sequential process steps, such process steps can be performed asynchronously. MDCE 218 is implemented as a part of a cloud service for automated application malware filtering for ad networks, shown as cloud service 222. In particular, MDCE 218 receives ad content from ad networks 210 (e.g., and/or from mobile devices). For each received ad content, MDCE 218 analyzes the ad content (e.g., using various static and dynamic techniques, such as described herein, to extract one or more behaviors, features, and/or other attributes of the ad content, which can include one or more apps and/or include links to one or more apps that can be executed on a target mobile device platform), extracts metadata from the ad content (e.g., which can include one or more apps, links such as URLs/URIs to web pages that can include various web content including possibly apps for downloading), and stores the extracted metadata 214 in a distributed database 212 (e.g., or another form of a data store) for the cloud service. For example, if the ad content includes web content (e.g., HTML or other web content), MDCE 218 can automatically extract features from the web content, such as links (e.g., URLs/URIs or other forms of link identifiers) and/or executable/dynamic content (e.g., which can later be used, as described below, to determine behavior associated with the executable/dynamic content included within the ad content). As another example, if the ad content includes an app or a link to an app for downloading, MDCE 218 can automatically extract features from the app (e.g., an app for an iOS platform, Android platform, Microsoft platform, and/or other mobile device operating system/device platform) and/or from the market place source of the app, including one or more of the following: app origin/source information (e.g., metadata associated with the market place source for the app, such as a category of the app in the app store and/or a distributor (as a distributor/developer may have a bad reputation, which can be used as input for whether the app desires to be associated with that distributor/developer)), comments, and/or other information associated with the source of the app in a public app store or other source of the app, images, executable code (e.g., native binary), script or source code, included files, HTML (e.g., HTML files), text (e.g., text files), images (e.g., image files), video (e.g., video files), audio (e.g., audio files), embedded files, compressed archives, certificates/signed files, advertising identifiers, SDKs used in the app (e.g., including, for example, ad distribution related SDKs), authentication server identifiers, GUI/screen shots of various stages of the app during execution, and/or other features or attributes that can be extracted from the app during static and/or dynamic analysis, as further described herein. MDCE 218 stores such extracted features of the app in app metadata 214.

For example, a user, such as a security/network administrator, for a customer (e.g., an ad network provider customer who desires to manage their ad content, an enterprise customer who desires to manage the mobile devices of their employees/users, an individual end user customer who desires to manage their own mobile device(s), an app store such as a public or private app store that desires to verify that apps do not violate certain app policies required by the app store, and/or other customers and/or use case customer scenarios) of the cloud service for automated application malware filtering for ad networks can visit portal 204 by interacting with a customer interface 208 of a software as a service (SAAS) portal 206 to input various policy information (e.g., such as for an enterprise policy, a customer can input various policy information for the customer's company, such as ACME Company). For example, the user can input features or behaviors that are allowed or not allowed for ad content (e.g., rules for apps such as location tracking, recording, access to contacts, and/or other features or behaviors of apps; and/or rules for ad content, such as no illicit ads) that can be applied as an enterprise policy using various techniques described herein. As another example, the user can input various approved/whitelisted or unapproved/blacklisted apps or categories of apps for ad content (e.g., a particular game app can be blocked or all game related apps can be blocked from ad content) that can be applied as an enterprise policy using various techniques described herein. The various feature and behavior information that is configured (e.g., as policy criteria) and/or extracted (e.g., based on ad content analysis to provide any such feature and behavior information related to the app) is stored in feature and behavior data 216 of distributed database 212. As further described below, a CPE 220 of cloud service for automated application malware filtering for ad networks 222 uses ad content metadata 214 and feature and behavior data 216 to facilitate the generation of a report that identifies any ad content that was determined to be in violation of a policy and/or a policy for the entity (e.g., an enterprise policy), and the report is output to the user using portal 204 (e.g., the report can identify the ad content and any supporting data that triggered a violation of the policy by such ad content, such as which ad content was blocked or filtered, and/or other information, such as why such ad content was blocked/filtered or in violation of the policy). As also shown, portal 204 is in communication with cloud storage 202 for storing, for example, customer reports, customer preferences and user information, and/or other information.

In one embodiment, ad content processing engine 220 of cloud service for automated application malware filtering for ad networks 222 uses ad content metadata 214 and feature and behavior data 216 to determine whether ad content is in violation of a policy (e.g., the policy can also be stored in distributed database 212, shown as policy 228). For example, CPE 220 can perform various techniques as described herein to determine whether the ad content is in violation of a policy and/or an enterprise policy. Based on automated analysis of ad content and by applying the policy, whether the ad content should be blocked, filtered, or allowed (e.g., or another action performed, such as logging, reporting, and or tagging the ad content for further analysis) is determined. Also, on automated analysis of ad content and by applying the policy, a report can be generated that identifies any ad content that is determined to be in violation of the policy and/or the enterprise policy. For example, the report can include a score (e.g., a probability score) based on the analysis for each set of ad content of whether the ad content can be associated with a specified feature/behavior (e.g., such as including malware, such as by including or linking to a malicious app or other malicious content, or by including content that is associated with suspicious or malicious privacy features/behaviors, such as by including or linking to an app or other content that performs behaviors that violate privacy requirements/settings). If a given ad content's probability score exceeds or meets a threshold (e.g., a score determined to indicate a high probability of association of the ad content with the attribute, such as a malware behavior, a privacy violation related behavior, links to blacklisted and/or suspicious apps or other content, and/or other attributes), then the app can be determined to be associated with the attribute (e.g., if the probability score exceeds 75% or some other threshold value that the analyzed app is a game, then the analyzed app can be categorized as a game, and the policy for games can be applied to the analyzed app to determine whether or not the analyzed app violates the app policy requirements, such as whether ad content that includes or links to apps for games is allowed or not, and/or other criteria/requirements). The ad content (if any) determined to be in violation of the policy and the probability score (if any) can be stored in feature and behavior data 216, which can then be used for performing actions, such as filtering, and/or can also be used for reporting to the entity using portal 204. In one implementation, portal 204 includes a report generation interface that shows the customer the ad content (e.g., along with various supporting data) determined to be in violation of the policy for the entity as further described herein.

In one embodiment, MDCE 218 scans ad content, including any applications in or linked to the ad content, in an automated manner to determine what data is included within the ad content and/or such applications (if any). This data (e.g., metadata, such as app metadata) is extracted, stored, and used by CPE 220 to facilitate ad content processing as described herein with respect to various embodiments. For example, ad content can include a collection of files that accompany the ad content, including executable code, resources, and all data contained within the ad content package. MDCE 218 can scan the ad content, including any included or linked to apps, and can extract various data including, for example, the following: images, strings, keywords and phrases, URLs, email addresses, phone numbers, databases, Software Development Kits (SDKs) in use, and any other attributes and/or identifying information that may be used to facilitate ad content processing as described herein with respect to various embodiments. For example, the extracted data can be scanned and analyzed (e.g., decoded, parsed, and/or dissected) to determine whether the ad content is in violation of the policy for the entity. In one embodiment, the ad content, including any embedded or linked to apps identified based on analysis of the ad content, is analyzed both statically and dynamically to extract the metadata, such as URLs within the app (e.g., including URLs that are dynamically resolved and followed URLs).

In one embodiment, MDCE 218 includes multiple scanner engines, including a continuous scanner (CS) 224 and a desktop scanner (DS) 226, and also is in communication with distributed database 212 as shown. For example, the scanner engines can be run within cloud 222 (e.g., or can be implemented using other execution environments). In some implementations, the scanner engine results can be stored in a high performance database relating to the ad content metadata, shown as ad content metadata 214, accessible by all of the instances of the scanner engines currently in operation. As also shown, ad content metadata 214 is used in conjunction with feature and behavior data 216 by CPE 220 to determine whether the ad content is in violation of a policy.

Ad Content Processing Engine

In one embodiment, the ad content processing engine, shown as CPE 220 in FIG. 2, scans ad content in an automated manner to determine if ad content includes or links to external content and resources (e.g., apps, web content, and/or other content/resources). If the ad content does link to any external resources, CPE 220 obtains and analyzes such external resources and factors the findings in analysis results for the ad content being evaluated. For example, ad content can be determined to include links to applications being hosted by application markets. In this case, CPE 220 can retrieve the external application for analysis. If the link to the application has already been retrieved or analyzed, the CPE may optionally use the previous analysis data result(s).

In one embodiment, ad content processing engine 220 includes rules and/or signatures 230 to automatically analyze the ad content using various techniques described herein with respect to various embodiments. In one implementation, the analyzed ad content is scored using a probability score, in which the probability score is generated to provide an indicator that the analyzed ad content is associated with a particular attribute (e.g., feature, behavior, category, or other attribute). For example, if the analyzed ad content has a probability score value for the ad content being associated with toll fraud that exceeds a threshold value (e.g., 75% or some other value), then the analyzed ad content can determined to be associated with toll fraud. In some cases, the analyzed app can be associated with two or more attributes (e.g., which may be relevant to a given policy), such as if the analyzed app has probability score values associated with two or more app attributes that each exceed the threshold value (e.g., the analyzed app can be associated with privacy and toll fraud, and/or, in some cases, the highest probability score value can be used to provide a primary attribute for the analyzed ad content, with the other categories being provided as secondary attributes for the analyzed ad content). In one implementation, the potential attributes are pre-configured based on a policy. In another implementation, the potential attributes are pre-configured based on an enterprise policy. For example, threshold probability score settings can also be configured based on a policy and/or an enterprise policy.

A common scenario for malicious mobile apps is toll fraud, which typically is used by scammers to bill victims using premium SMS services. For example, scammers can have an app automatically send SMS messages to numbers for monetary gains, often without the mobile device end user ever knowing. The techniques described herein can be applied to prevent the scammers from being able to use an ad network to spread the malicious mobile app by performing the following as described below. For example, the system shown in FIG. 2 can be configured to perform the following operations: parse the app from the ad content and obtaining the app extracted from the ad content, executing the app (e.g., in an emulation environment, such as an instrumented virtual machine (VM) environment to monitor the app behavior in an emulated mobile device environment) and observing for malicious, suspicious, or other behaviors, such as sending SMS messages to premium numbers without the mobile end users consent or permission; and, if such behavior is determined, blocking or filtering the ad content with the malicious app from reaching the targets.

Another common scenario is marketing companies looking to collect data that may violate a policy (e.g., privacy related requirements in a policy) or may be deemed undesirable by a mobile device end user. For example, such marketing companies can use an ad network as a distribution mechanism to get their app installed on one or more unbeknownst mobile device end users, which can be an original app or an existing app repackaged with new undesirable behavior. This can be, for example, an app that harvests phone numbers, user behaviors on the phone (e.g., existing apps already on the phone), and/or contacts. The various techniques described herein can be used to prevent these marketing companies from being able to (ab)use the ad network to spread their apps (e.g., malware) by filtering (e.g., detecting and blocking) ad content that includes or links to such apps.

Example Scenario #1

An application is submitted to a popular app store by an application developer and the app store, which on initial screening, determines that the app is clean of any undesirable behaviors. As a result, the app store allows the application to be posted and downloaded by end users on their app store. However, the application includes functionality to pass advertisements through a popular ad network, commonly added in by application developers in order to monetize their application through in-app ads (e.g., to generate ad revenue). The application is then downloaded by a mobile app end user, which when running the app is presented with in-app ad's that are sent by the ad network included inside the application. Unsuspecting to the mobile app end user, a malicious application developer wrote an app that upon installation on a mobile device, sends premium SMS numbers without the mobile end user knowing. The malicious application developer submits ad content to send over the ad network, linking to a malicious app. Before sending the submitted malicious ad content to the unsuspecting mobile end user, the ad content is sent to the CPE for processing. The delivery mechanism of the ad content to the CPE can include the ad content data being directly sent, by the ad network, to the CPE before sending to the end user. In this scenario, the delivery mechanism can include a cloud-based REST-API call to the CPE that includes the ad content data. In some implementations, various techniques can be implemented to intercept ad delivery intended to be delivered to mobile devices for purposes of scanning the ad content using various techniques described herein with respect to various embodiments. The CPE automatically scans the ad content, identifies a link to the malicious app, analyzes the malicious app, and finds the malicious or undesirable behavior(s) performed by the malicious app. The ad content is then automatically filtered from the unsuspecting mobile end user, protecting the mobile device and mobile end user from the malicious or undesirable behavior(s).

Example Scenario #2

It is common for enterprises and corporations to have an internal mobile app store (e.g., a private app store) that is used to distribute mobile apps to employees. Commonly, apps are scanned to determine whether the apps pass a certain list of corporate policy requirements (e.g., analyzed based on an enterprise policy, such as an enterprise app policy), such as not sending over geo-location for employees, not sending the corporate contact book to third parties, encrypting certain data (e.g., passwords or other sensitive data), and/or other requirements or criteria. In this case, the CPE and policies can, in addition to, for example, filtering based on malicious behaviors, filter applications that are coming through the in-app ads that violate specific corporate policies (e.g., enterprise policies, such as enterprise app policies).

Policies for Application Malware Filtering for Ad Networks

As further discussed below, the policy and/or enterprise policy can also configure various other requirements/criteria for ad content, such as based on apps (e.g., via in-ad provided ad content) that are determined to be associated with the ad content, which can be implemented using, for example, whitelists/blacklists of apps and/or URLs, categories of apps (e.g., games can be blacklisted and productivity apps can be whitelisted in an enterprise policy), and/or based on other ad content features and/or behaviors, such as privacy, malware, and/or other attributes. For example, an (enterprise) policy can specify rules on whether an app is safe or unsafe (e.g., configured whitelists and blacklists of apps). The (enterprise) policy can also set rules based on app behavior(s), such as whether the app behaves suspiciously/maliciously, performs location tracking, accesses a contacts/address book on the mobile device, accesses social apps/APIs, accesses a device microphone or camera, accesses a feature/function of the mobile device/operating system platform in a manner that is not consistent or in compliance with the permissions granted to the app by the user/mobile device, and/or performs any other specified behavior. The (enterprise) policy can also set rules based on characteristics/features of the ad content, such as a URL/hostname associated with the ad content (e.g., links included within the ad content or dynamically generated by the ad content), a reputation of a source of content included in the ad content (e.g., domain provider of a web site linked to by content included in the ad content), whether the ad content uses encryption or obfuscation (e.g., ad content that has encrypted code/data as a potential attempt to evade malware or other suspicious attribute detection), and/or other specified attributes.

In one implementation, portal 204 has multiple interfaces including the following: a policy specification interface and a report generation interface. In one embodiment, the report generation interface shows the user which apps include features that are in violation of a policy for the entity. For example, CPE 220 can continually or periodically update the reports as new scans of ad content are completed. In one implementation, a user is able to specify alerts if ad content is determined to violate the entity's policy. For example, the report can include a sorted list of ad content from most policy violations to least policy violations (e.g., ad content can also or alternatively be sorted on association with a particular app or provider) and indicate whether the ad content was filtered, blocked, and/or what (if any) actions were performed with respect to the ad content (e.g., and if a score is generated for the ad content, total score and/or by attribute, such as a privacy score and/or malware score, such can also be included in the report). As another example, the customer can verify whether one or more of the analyzed ad content in a reported violation list are policy violations or not (e.g., the ad content can be whitelisted and/or blacklisted in the policy and/or the feedback can be used as an automated feedback loop to adjust machine generated scoring techniques used to generate such probability scores for the ad content).

In one embodiment, the report generation interface includes a programmatic interface (e.g., a RESTful API) to allow customers to request reports, receive a report feed, respond to ad content violation reports, and/or upload ad content for automated ad content malware analysis by the cloud service. By providing such an interface to the report generation interface, customers can integrate these services into their own customized user interface for interacting with the cloud service automated application malware filtering for advertising networks.

In an example implementation, the ad content meta data is stored in a data store (e.g., using an open source database, such as JSON or Apache Lucene, or other open source or commercially available databases). For certain formats of content, different databases can be used for storing and search such content, such as for images and searching or other representations.

Figure 3:
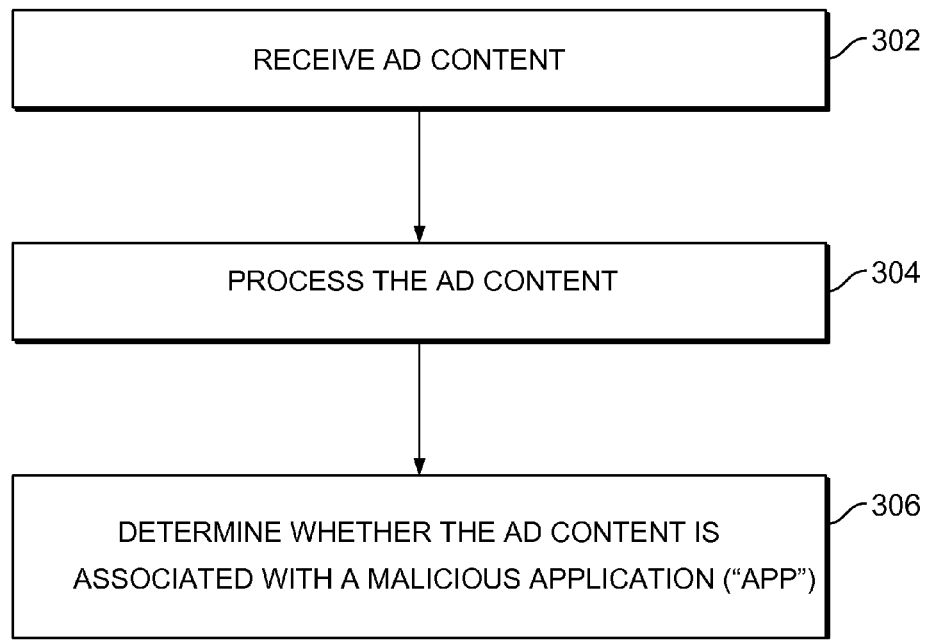
FIG. 3 is a flow diagram illustrating a process for providing application malware filtering for advertising networks in accordance with some embodiments.

FIG. 3 is a flow diagram illustrating a process for providing application malware filtering for advertising networks in accordance with some embodiments. For example, the process can be performed using the cloud service and malware filtering for advertising networks system described above with respect to FIGS. 1 and 2.

At 302, ad content is received. For example, the ad content can be provided to a cloud service for ad content analysis using various techniques described herein, such as via an API, via a user portal, and/or through another interface mechanism. As another example, the ad content can be intercepted on a mobile device using a client solution (e.g., a local function, such as an agent that executes on a processor of the mobile device), which can locally perform ad content analysis (e.g., a complete or partial set of analysis can be performed locally using various techniques described herein and, in some cases, the ad content analysis is intercepted locally at the client device and forwarded to a cloud service to perform a complete or additional analysis, in which the ad content can be provided to the cloud service via an API and/or through another interface mechanism).

At 304, processing the ad content is performed. In an example implementation, the ad content is processed using an ad content processing engine. For example, various feature and behavioral analysis, including both static and dynamic analysis techniques, can be performed using various techniques for providing application malware filtering for advertising networks.

At 306, automatically determining whether the ad content is associated with a malicious application ("app") is performed. For example, if the ad content is determined to be associated with malware, then the ad content can be reported and/or filtered. As another example, if the ad content is determined to violate a policy, then the ad content can be reported and/or filtered.

In one embodiment, application malware filtering for advertising networks further includes determining that the ad content is associated with an in-app purchase that is associated with the malicious app. In one embodiment, application malware filtering for advertising networks further includes determining that the ad content is associated with malicious or undesirable content.

In one embodiment, application malware filtering for advertising networks further includes determining that the ad content is associated with malicious or undesirable content based on a policy and/or an enterprise policy. For example, an ad network or an enterprise can configure a policy to manage which ad content to allow to be distributed via an app delivered via ad content to mobile devices executing the app (e.g., through in-app advertising) using various techniques described herein.

In one embodiment, application malware filtering for advertising networks further includes determining whether the malware app attempts to thwart malware app detection by using an ad network for app distribution. For example, the cloud service can compare an app extracted from the ad content and determine whether the app matches any previously analyzed apps available from one or more public app stores (e.g., using a hash or other techniques for uniquely identifying apps). In this example, if the app that is linked to or included in the ad content does not match any of the apps that are known to be available in such public app stores (e.g., the cloud service can maintain a data store that includes a hash or other unique identifier of apps available in such public app stores), that can be an indicator that this is a new app that may be using ad distribution networks as a distribution mechanism to avoid malware app detection (e.g., which would otherwise be performed by public app stores before allowing such apps to be available in their app stores). These and other techniques can be used to determine whether the malware app attempts to thwart malware app detection by using an ad network for app distribution.

Figure 4:
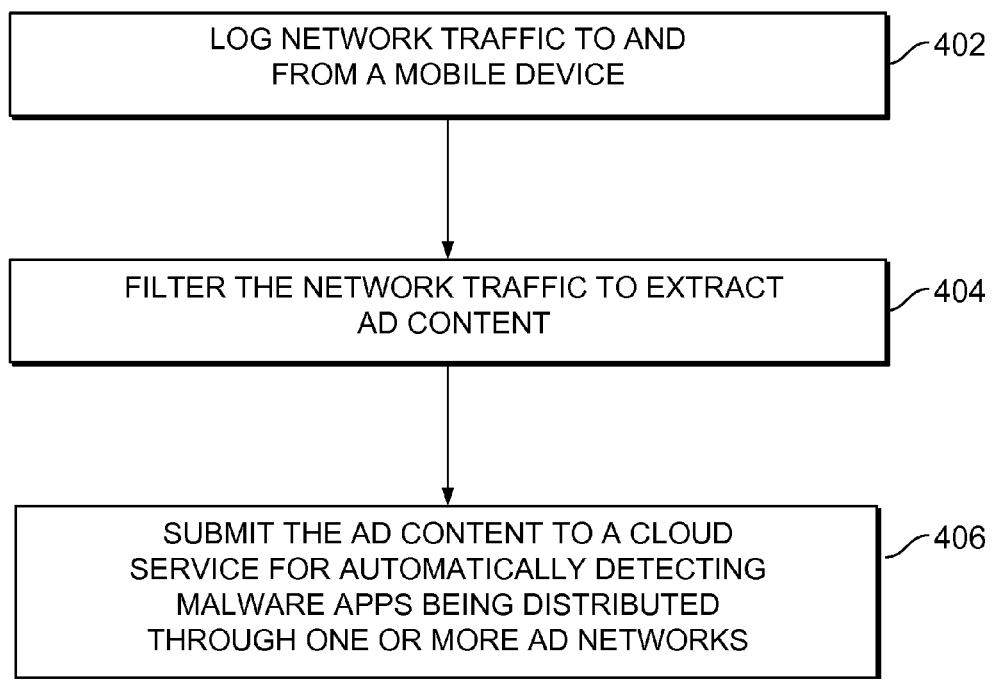
FIG. 4 is another flow diagram illustrating a process for providing application malware filtering for advertising networks in accordance with some embodiments.

FIG. 4 is another flow diagram illustrating a process for providing application malware filtering for advertising networks in accordance with some embodiments. For example, the process can be performed using various techniques for in-line application malware filtering for advertising networks system described above with respect to FIGS. 1 and 2.

At 402, logging network traffic to and from a mobile device is performed. For example, a client agent can be executed on the mobile device to log network traffic, which can be implemented to analyze the logged network traffic to the mobile device to detect that ad content is downloaded to the mobile device (e.g., via in-app advertising).

At 404, filtering the network traffic to extract ad content is performed. For example, the network traffic can be filtered to extract the ad content. In an example implementation, ad content is extracted from the network traffic so that the ad content can be analyzed prior to allowing the ad content to be provided to an app executed on the mobile device.

At 406, submitting the ad content (e.g., and/or links to the ad content) to a cloud service for automatically detecting malware apps (e.g., and/or other undesirable content included in and/or linked to in the ad content, such as based on a policy) being distributed through one or more ad networks is performed. For example, the ad content can be filtered or blocked based on results of the ad content analysis based on a policy. In an example implementation, the filtered ad content (if any) can be returned to the mobile device for presenting on the mobile device via the app (e.g., that provided in-app ad content and/or in-app app purchases). In another example implementation, the action to perform can be communicated to the mobile device.

In one embodiment, in-line application malware filtering for advertising networks further includes receiving a response from the cloud service that the ad content is associated with an in-app purchase that is associated with a malicious app. In one embodiment, in-line application malware filtering for advertising networks further includes receiving a response from the cloud service that the ad content is associated with malicious or undesirable content. In one embodiment, in-line application malware filtering for advertising networks further includes receiving a response from the cloud service that the ad content is associated with malicious or undesirable content based on a policy. In one embodiment, in-line application malware filtering for advertising networks further includes receiving a response from the cloud service that the ad content is associated with malicious or undesirable content based on an enterprise policy.

In one embodiment, in-line application malware filtering for advertising networks further includes examining (e.g., recursively) one or more links included in the ad content (e.g., go to web site(s), app store(s), and/or other sources linked to from the ad content).

Figure 5:
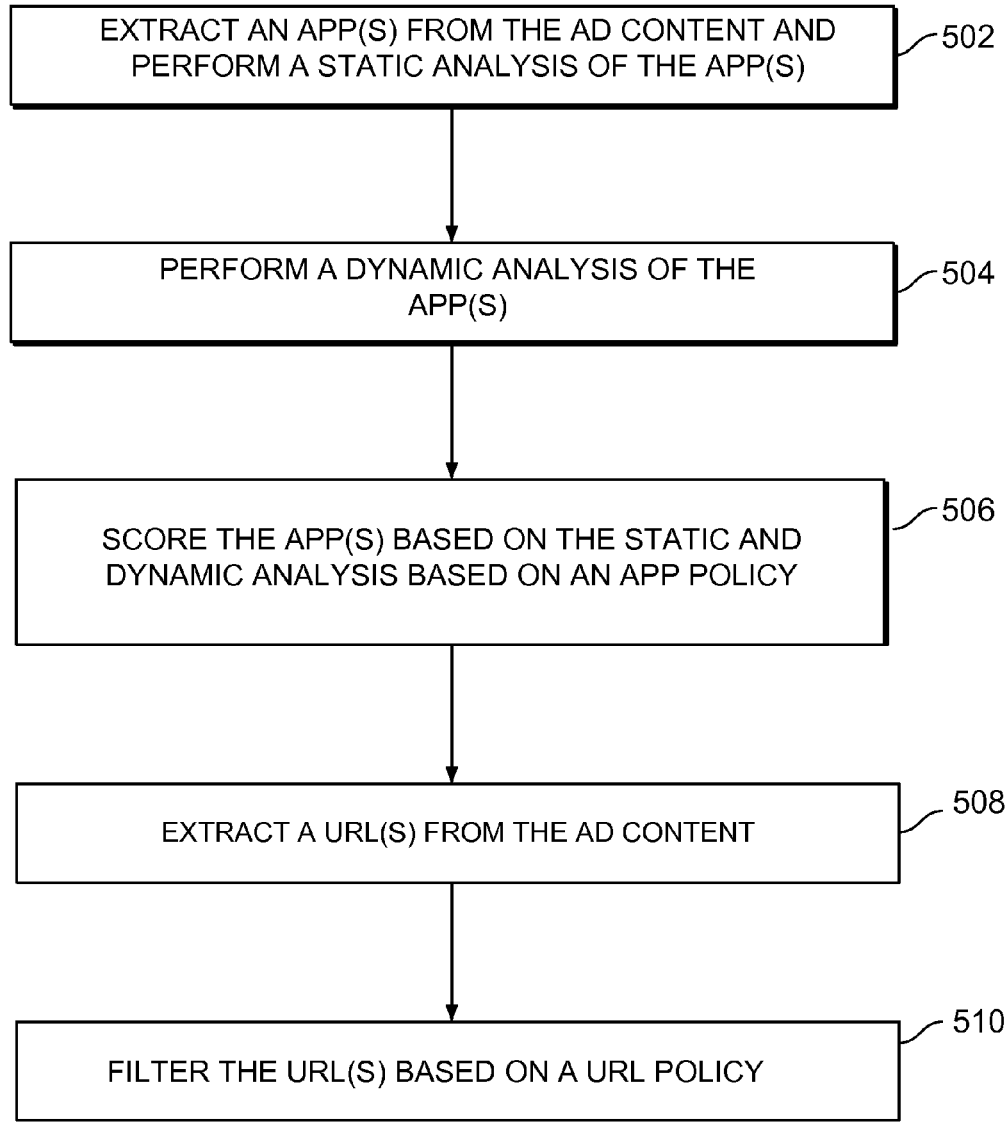
FIG. 5 is another flow diagram illustrating a process for providing application malware filtering for advertising networks in accordance with some embodiments.

FIG. 5 is another flow diagram illustrating a process for providing application malware filtering for advertising networks in accordance with some embodiments. For example, the process can be performed using the cloud service and malware filtering for advertising networks system described above with respect to FIGS. 1 and 2. In this example, ad content can be received, for example, by a cloud service for providing malware filtering for advertising networks system.

At 502, extracting an app(s) from the ad content and performing a static analysis of the app(s) is performed. In an example implementation, a disassembly/byte code pass of the app can be performed to provide a static analysis of the app. A disassembly/byte code pass phase can be performed using a disassembler. The disassembly/byte code pass phase can include inspecting byte code or assembly language (e.g., if applicable) to determine what the app is supposed to do—how it is coded to perform. For example, native instructions and virtual machine (VM) byte codes can be processed and analyzed. In some cases, app methods, such as encryption methods, can be analyzed for risky behaviors (e.g., using hard-coded passwords to protect private data or calling methods with risky encryption algorithms). As another example, the static analysis phase can include determining whether certain behaviors are implemented by the app (e.g., performing an operation without user permission, such as sending text/SMS messages without a user's permission, using GPS/location services without a user's permission, and/or various other behaviors of potential interest, such as those described herein with respect to various embodiments). As yet another example, native instructions and VM byte codes can be processed and analyzed.

At 504, performing a dynamic analysis of the app(s) is performed. In an example implementation, a run-time emulation is performed to provide a dynamic analysis of the app (e.g., performing dynamic analysis using instrumented emulation techniques). The run-time emulation can include executing the app on one or more emulators (e.g., virtual machines or emulators, such as a platform version of Android provided using such emulators that simulate an Android app execution environment, in which apps executed in such an environment cannot detect that they are executing in an Android emulation environment as opposed to executing on an actual user's Android mobile device). The dynamic analysis can be implemented to monitor and analyze internal and external app API calls, including kernel level API calls. Such a dynamic analysis facilitates performing a deeper dive into risky and/or other undesired app behaviors that otherwise can be hidden from a static analysis (e.g., such as new components being downloaded during run-time/execution of the app and/or other suspicious and/or potentially malicious behaviors).

In one embodiment, a dynamic analysis (e.g., instrumented emulation) includes hosting a series (e.g., farm) of emulators, in which instrumenting as part of the analysis is provided. On some platforms, these are forked versions of open source operating systems, in which API hooks into the kernel, virtual machine(s), system calls, etc. are provided to monitor the apps executed in the emulated environment. On some platforms, a custom kernel and re-implemented standard libraries are used to allow the closed-source operating system apps to monitor the apps executed in the emulated environment. On some platforms, hooking and performing binary patching on "simulators" to monitor the apps are executed in the emulated environment. Once the app is executing in the emulated environment, the dynamic analysis phase collects data on API calls that occur (e.g., and the values returned from those APIs), so that a rule set can be applied to that data set. For example, correlating API calls to permissions can be determined using various static and dynamic techniques described herein to determine whether the app exhibits any behaviors that exceed or are outside the scope of authorizations—proper user permissions. In some embodiments, the apps are instrumented during run-time execution using a combination of one or more of the following: random behaviors, intents from other apps, and control flow graph(s) maps that attempt to reach certain API calls.

At 506, scoring the app(s) based on the static and dynamic analysis based on an app policy is performed. For example, an app can be determined to be malware, to violate privacy rules, to be a game, and/or to be associated with another attribute based on the app policy. In some implementations, a given app can be associated with one or more of such attributes. As an example, an app can be determined to be a gaming app that is also determined to be associated with malware or privacy violations.

At 508, extracting a uniform resource locator (URL(s)) (e.g., or a uniform resource indicator (URI) or other types of Internet related or World Wide Web related links) from the ad content is performed. One example is one or more links that in the ad content can be identified (e.g., in some cases, content available from navigating to such links can also be analyzed as discussed above). In an example implementation, ad content can similarly be analyzed using static and dynamic techniques in order to identify embedded links in the ad content (e.g., some links may be obfuscated, dynamically generated, and/or encrypted in packed content or use other obfuscation/encrypted related techniques, such that those links can be identified using various dynamic analysis techniques of the ad content). For example, as discussed above, a static analysis of web content and/or other non-executable content can be used to extract links, such as URLs/URIs. As also discussed above, a dynamic analysis of other executable content of the ad content (e.g., JavaScript or other dynamic web page content) can be used to extract dynamically generated links, such as URLs/URIs.

At 510, filtering the URL(s) based on a URL policy is performed. For example, the URL policy can include whitelisted URLs and blacklisted URLs. In an example implementation, a policy for filtering ad content can include both an app policy and a URL policy.

In one embodiment, application malware filtering for advertising networks further includes examining (e.g., recursively) one or more links included in the ad content (e.g., go to web site(s), app store(s), and/or other sources linked to from the ad content).

In one embodiment, application malware filtering for advertising networks further includes extracting an advertising network identifier (e.g., parsing and extracting an ad ID included in a link to ad content, such as adserver.com/token/adid=1234) associated with the ad content.

An example of a link (e.g., URLs/URIs) for adware SDKs is provided below. The filtering network traffic is a connection from an application to the ad network at "ad.where.com" and includes a unique identifier for the app in the apikey field (e.g., in this example, this unique identifier equals Ba46Xs5R7L82WQODKfCEJIHD2STGnlIh) as shown in the below example.

Host: ad.where.com
Connection: Keep-Alive
User-Agent: Apache-HttpClient/UNAVAILABLE (java 1.4)
GET /jin/spotlight/ads?v=2.4&platformid=53&pubid=qhpn
&apikey=Ba46Xs5R7L82WQODKfCEJID2STGnlIh&
placement=bottom&format=html&channel=mobile&ua=
Mozilla %2F5.0+%28Linux % 3B+U %3B+Android+
4.2.2%3B+en-us %3B+SCH-I545+Build %2FJDQ39E
%29+AppleWebKit %2F534.30+%28KHTML %2C+like+
Gecko %29+Version %2F4.0+Safari %2F534.30&ouid=
e507929676a2f4c9&u=354904008327814&lat=37.783699
&lng=-122.467819&city=San+Francisco&state=CA&
country=US&width=320&height=50&gender=m&age=27
HTTP/1.1

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for application ("app") malware filtering for advertising ("ad") networks, comprising:
   a hardware processor of a cloud service for ad network providers for automatically detecting malware apps being distributed through an ad network, the processor configured to:
   receive ad content;
   process the ad content, comprising:
      determine whether the ad content includes a link to an app; and
      in the event that the ad content includes the link to the app, scan the app, comprising:
         determine an attribute of the app, wherein the attribute includes at least one of a behavior, a feature, or a category;
   automatically determine whether the ad content is associated with a malicious app, comprising:
      assign a probability score to the ad content based on the attribute of the app;
      determine whether the probability score exceeds a threshold value; and
      in the event that the probability score exceeds the threshold value, determine the ad content is associated with the malicious app; and
   determine that the ad content is associated with malicious or undesirable content based on a policy; and
   a memory coupled to the hardware processor and configured to provide the hardware processor with instructions.

2. The system recited in claim 1, wherein the hardware processor is further configured to:
   determine that the ad content is associated with an in-app purchase that is associated with the malicious app, the in-app purchase relating to a purchase made within the malicious app.

3. The system recited in claim 1, wherein the hardware processor is further configured to:
   determine that the ad content is associated with malicious or undesirable content based on an enterprise policy.

4. The system recited in claim 1, wherein the hardware processor is further configured to:
   perform a static analysis of the ad content.

5. The system recited in claim 1, wherein the hardware processor is further configured to:
   perform a dynamic analysis of the ad content.

6. The system recited in claim 1, wherein the hardware processor is further configured to:
    determine whether the malicious app attempts to thwart malware app detection by using the ad network for app distribution.

7. The system recited in claim 1, wherein the hardware processor is further configured to:
    receive the ad content from an ad network provider.

8. A method of application ("app") malware filtering for advertising ("ad") networks, comprising:
    receiving ad content;
    processing the ad content using a processor of a cloud service for ad network providers for automatically detecting malware apps being distributed through an ad network, comprising:
        determining whether the ad content includes a link to an app; and
        in the event that the ad content includes the link to the app, scanning the app, comprising:
            determining an attribute of the app, wherein the attribute includes at least one of a behavior, a feature, or a category;
    automatically determining whether the ad content is associated with a malicious app, comprising:
        assigning a probability score to the ad content based on the attribute of the app;
        determining whether the probability score exceeds a threshold value; and
        in the event that the probability score exceeds the threshold value, determining the ad content is associated with the malicious app; and
    determining that the ad content is associated with malicious or undesirable content based on a policy.

9. The method of claim 8, further comprising:
    determining that the ad content is associated with an in-app purchase that is associated with the malicious app, the in-app purchase relating to a purchase made within the malicious app.

10. The method of claim 8, further comprising:
    determining that the ad content is associated with malicious or undesirable content based on an enterprise policy.

11. A computer program product for application ("app") malware filtering for advertising ("ad") networks, the computer program product being embodied in a tangible non-transitory computer readable storage medium and comprising computer instructions for:
    receiving ad content;
    processing the ad content at a cloud service for ad network providers for automatically detecting malware apps being distributed through an ad network, comprising:
        determining whether the ad content includes a link to an app; and
        in the event that the ad content includes the link to the app, scanning the app, comprising:
            determining an attribute of the app, wherein the attribute includes at least one of a behavior, a feature, or a category;
    automatically determining whether the ad content is associated with a malicious app, comprising:
        assigning a probability score to the ad content based on the attribute of the app;
        determining whether the probability score exceeds a threshold value; and
        in the event that the probability score exceeds the threshold value, determining the ad content is associated with the malicious app; and
    determining that the ad content is associated with malicious or undesirable content based on a policy.

12. The computer program product recited in claim 11, further comprising computer instructions for:
    determining that the ad content is associated with an in-app purchase that is associated with the malicious app, the in-app purchase relating to a purchase made within the malicious app.

13. The computer program product recited in claim 11, further comprising computer instructions for:
    determining that the ad content is associated with malicious or undesirable content based on an enterprise policy.

14. A system for in-line application ("app") malware filtering for advertising ("ad") networks, comprising:
    a hardware processor of a mobile device configured to:
        log network traffic to and from the mobile device;
        filter the network traffic to extract ad content, comprising:
            determine whether the ad content includes a link to an app; and
            in the event that the ad content includes the link to the app, scan the app, comprising:
                determine an attribute of the app, wherein the attribute includes at least one of a behavior, a feature, or a category;
        submit the ad content to a cloud service for automatically detecting malware apps being distributed through one or more ad networks, comprising:
            assign a probability score to the ad content based on the attribute of the app;
            determine whether the probability score exceeds a threshold value; and
            in the event that the probability score exceeds the threshold value, determine the ad content is associated with the; malicious app; and
        receive a response from the cloud service that the ad content is associated with malicious or undesirable content based on a policy; and
    a memory coupled to the hardware processor and configured to provide the hardware processor with instructions.

15. The system recited in claim 14, wherein the hardware processor is further configured to:
    receive a response from the cloud service that the ad content is associated with an in-app purchase that is associated with a malicious app, the in-app purchase relating to a purchase made within the malicious app.

16. The system recited in claim 14, wherein the hardware processor is further configured to:
    receive a response from the cloud service that the ad content is associated with malicious or undesirable content based on an enterprise policy.

17. The system recited in claim 1, wherein the feature includes app origin/source information, comments associated with the source, executable code, script or source code, an included file, a HyperText Markup Language (HTML) file, a text file, an image file, a video file, an audio file, an embedded file, a compressed archive, a certificate/signed file, an advertising identifier, a software development kit (SDK) used in the app, an authentication server identifier, or a graphical user interface (GUI)/screen shot of the app during execution.

18. The system recited in claim 1, wherein the behavior includes at least one of location tracking, recording, access to content, or toll fraud.

* * * * *

UNITED STATES PATENT AND TRADEMARK OFFICE
CERTIFICATE OF CORRECTION

| | | |
|---|---|---|
| PATENT NO. | : 9,027,140 B1 | Page 1 of 1 |
| APPLICATION NO. | : 14/205205 | |
| DATED | : May 5, 2015 | |
| INVENTOR(S) | : Watkins et al. | |

It is certified that error appears in the above-identified patent and that said Letters Patent is hereby corrected as shown below:

In the Claims:

In column 20, claim 14, line 36 after "with the" delete ";".

Signed and Sealed this
Twelfth Day of July, 2016

Michelle K. Lee
*Director of the United States Patent and Trademark Office*